| United States Patent [19] | [11] Patent Number: 4,954,413 |
|---|---|
| Uchikawa et al. | [45] Date of Patent: Sep. 4, 1990 |

[54] METHOD OF MAKING PHOTOCONDUCTIVE PARTICLES

[75] Inventors: Fusaoki Uchikawa; Kenji Nomura, both of Amagasaki, Japan

[73] Assignee: Mitsubishi Denki Kabushiki Kaisha, Tokyo, Japan

[21] Appl. No.: 423,694

[22] Filed: Oct. 18, 1989

Related U.S. Application Data

[63] Continuation of Ser. No. 168,993, Mar. 16, 1988, abandoned.

[30] Foreign Application Priority Data

Mar. 17, 1987 [JP] Japan .................. 62-62895
Mar. 27, 1987 [JP] Japan .................. 62-71733

[51] Int. Cl.$^5$ .............................................. G03G 5/09
[52] U.S. Cl. ................................... 430/135; 430/90; 430/91; 430/92; 430/93; 430/95; 430/901
[58] Field of Search ................. 430/90, 91, 92, 93, 430/95, 106, 135, 901

[56] References Cited

U.S. PATENT DOCUMENTS

| 3,121,006 | 2/1964 | Middleton et al. ............... 430/31 |
| 3,238,149 | 3/1966 | Spurr .................. 430/135 |
| 3,837,850 | 9/1974 | Miyatuka ..................... 430/84 |
| 3,907,650 | 9/1975 | Pinsler ..................... 430/65 X |
| 4,542,084 | 9/1985 | Watanabe et al. ............. 430/901 X |

FOREIGN PATENT DOCUMENTS

| 0225785 | 4/1986 | European Pat. Off. . |
| 51-77238 | 7/1976 | Japan ..................... 430/65 |
| 54-14236 | 2/1979 | Japan ..................... 430/63 |
| 55-36853 | 3/1980 | Japan ..................... 430/135 |

OTHER PUBLICATIONS

"Selenium Coatings in the Thickness Range 0.2 to 2.5 Pv for Xerography", McNeil et al., Jour. Photo. Sci., vol. 7, 1959, pp. 26–32.

Derwent #80-54338C; Product of Electrochromic Oxide Material, e.g., for Displays—by Applying Metal Alkoxide to Base Sheet or Electrode and Decomposing Thermally or by Hydrolysing.

"Photoconductive Particles for One-Shot Color Electrophotographic Image Formation", by H. Watanaba et al., from Japan Display '86, pp. 568–571.

*Primary Examiner*—Roland E. Martin
*Attorney, Agent, or Firm*—Birch, Stewart, Kolasch & Birch

[57] ABSTRACT

A method for making a photoconductive powder which comprises the steps of preparing fine particles of metal oxide or metal hydroxide by hydrolyzing a metal alkoxide or metal acetylacetonate; and immersing the fine particles into pigment containing suspensions to provide three types of composite particles. Each of the suspensions contains a respective pigment having a spectral absorption band within the wavelength region of a one of the primary colors of the additive principle. Each type of the resultant composite particles is composed of the fine particles of the metal oxide or metal hydroxide and the associated pigment as a principal component.

7 Claims, 2 Drawing Sheets

METHOD OF MAKING PHOTOCONDUCTIVE PARTICLES

This application is a continuation of application Ser. No. 07/168,993 filed on Mar. 16, 1988, now abandoned.

BACKGROUND OF THE INVENTION

1. Field of the Invention

The present invention relates to a method of making highly sensitive photoconductive particles utilizable as a photoconductive toner for one-shot color electrophotographic image formation.

2. Description of the Prior Art

In an electrophotographic color copying machine, it is generally well known that toner particles are dyed in three different primary colors based on the subtractive principle, cyan, magenta and yellow. In order to produce color image reproduction, the color copying machine now available on the market is so designed as to perform a process of exposure, development and fixing three times, one for each primary color.

Since the repetition of the process of exposure, development and fixing for each primary color requires a fairly long time to complete reproduction of an image of one particular color by the use of an electrophotographic technique, one-shot color electrophotographic image formation has been proposed wherein a color image reproduction can be accomplished by a single process of exposure, development and fixing. In the practice of this one-shot color electrophotographic image formation method, photoconductive toner particles such as disclosed in, for example, the Japanese Unexamined Patent Publications No. 59-113448 and No. 60-31149 laid open to public inspection on June 30, 1984, and Feb. 10, 1985, respectively, are employed.

According to these prior publications, the photoconductive toner is made up of powdery photoconductive particles as a principal component, pigments of three different primary colors based on the subtractive principle, charge controller and binder. The principal component, that is, the photoconductive powder, is employed in the form of photoconductive material such as, for example, zinc oxide (ZnO) mixed with three types of spectral sensitizers such as pigments.

The photoconductive toner according to any one of these prior publications exhibits a problem in that, since the photoconductive material is merely mixed with the three types of spectral sensitizers, both are susceptible to separation and the photoconductive toner can not sustain a spectral sensitization for a prolonged period of time. Therefore, a binder made of synthetic resin is currently employed to bond the photoconductive toner particles with the three types of spectral sensitizers to minimize the separation.

On the other hand, the paper presented by H. Watanabe et al. in "JAPAN DISPLAY '86" and entitled "P3.3 Photoconductive Particles For One-shot Color Electrophotographic Image Formation", pages 568–571 which paper was published in 1986, discloses a similar photoconductive toner utilizing ZnO powder with pigments selectively responsive to the three different primary colors based on the additive principle, blue, green and red. According to this paper, in order to avoid the possible separation is discussed hereinbefore, the ZnO particles are allowed to adsorb the pigments selectively responsive to the three primary colors of the additive principle and then are dispersed in polymer to produce the photoconductive toner. The mere adsorption of the pigments by the ZnO powder does not eliminate the possibility of separation of the pigments from the powder particles.

In any event, the prior art methods of making the photoconductive toner are such that particles of metal oxide such as, for example, $TiO_2$ or ZnO are mixed, adsorbed, or bonded with the use of a resinous binder, with different pigments having selectivities of response to the three primary colors of the subtractive principle, thereby to produce the photoconductive particles for use in an electrophotographic color copying machine for the electrophotographic formation of color images.

The photoconductive toner made by any one of the prior art methods has a problem in that, since the force of contact between the metal oxide particles and the pigments is small with no energy band continued at the interface therebetween, the spectral sensitization of the pigments cannot be smoothly accomplished. Moreover, since the spectral sensitizing characteristics of the pigments are not satisfactory as discussed above, the spectral sensitivity to the three primary colors of the additive principle is very low with their spectral sensitivity curves greatly overlapping with each other as compared with their peak values.

In view of the foregoing problems, when the photoconductive toner produced according to the prior art methods is used in a color copying machine for the electrophotographic formation of the color image, the color rendering capability is not satisfactory and exhibits insufficient hue, sometimes accompanied by an irregular color reproduction and sometimes by color smear. In other words, with the conventional photoconductive toner now available on the market, distinct color reproduction cannot be achieved.

SUMMARY OF THE INVENTION

Therefore, the present invention has been devised with a view to substantially obviating the above discussed disadvantages and inconveniences inherent in the prior art apparatus and has for its principal object to provide an improved method of making photoconductive particles which can be used as a photoconductive toner in an electrophotographic copying machine, which particles can exhibit high spectral responses to the different primary colors of additive principle and can also exhibit a minimized overlap of spectral sensitivity curves as compared with their peak values.

Another important object of the present invention is to provide an improved method of the type referred to above, which can be advantageously utilized for a distinct color image reproduction.

According to a preferred embodiment of the present invention, a metal alkoxide or metal acetylacetonate is first hydrolyzed to yield fine particles of metal oxide or metal hydroxide. These fine particles are then immersed in suspensions, each containing a respective pigment capable of absorbing light of a corresponding one of the three primary colors of the additive principle, that is, red, blue and green, to provide three types of composite particles.

Specifically, the fine particles of metal oxide or metal hydroxide can be obtained by the hydrolysis of the metal alkoxide or the metal acetylacetonate which takes place in suspensions according to a so-called sol-gel method and exhibit a structure having an immeasurable number of interstices with fine cells delimited thereby. Therefore, when these fine particles so obtained are subsequently immersed in the suspensions containing the pigments capable of absorbing red, blue and green light, respectively, molecules of these pigments can penetrate into the interstices and can therefore be retained by the fine particles while covering the exterior surfaces of the fine particles, with the consequence that a photoconductive powder of high sensitivity can be obtained in the form of the composite particles composed of the fine particles of the metal oxide or the metal hydroxide and the pigments.

Thus, because of the presence of the fine interstices in the three types of particles of the photoconductive powder, the molecules of the respective pigments can be firmly and stably retained by the fine particles with the result that the force of direct contact between the pigment molecules and the fine particles is strengthened to facilitate the spectral sensitization. Therefore, the three types of the fine photoconductive particles obtained according to the method of the present invention can exhibit a high spectral sensitivity to light of the additive primary colors with overlap of their spectral sensitivity characteristic curves being minimized relative to the peak values. Therefore, when the photoconductive powder according to the present invention is used as photoconductive toner in an electrophotographic color copying machine, a clear and distinct color image reproduction can be satisfactorily accomplished.

According to another preferred embodiment of the present invention, a first principal material containing one or more compounds, which are selected from the group consisting of metal alkoxide and metal acetylacetonate and which are combined with the same metal, and a first pigment having a spectral absorption band within the wavelength region of red color, a second principal material containing one or more of the above mentioned compounds and a second pigment having a spectral absorption band within the wavelength region of blue color, and a third principal material containing one or more of the above mentioned compounds and a third segment having a spectral absorption band within the wavelength region of green color are mixed in respective solutions to provide first, second and third suspensions, respectively.

The first to third principal materials contained in these first to third suspensions, respectively, are allowed to undergo hydrolysis to produce corresponding, first, second and third composite particles composed of particles of oxides of the above mentioned metal and particles of the respective pigments.

The metal alcoxide or the metal acetylacetonate used are hydrolyzed in the suspensions according to a so-called sol-gel method to produce the metal oxide particles. When the pigments are present in the suspensions during the hydrolysis taking place therein, the pigments can be combined into the structure of the metal oxide or the metal hydroxide during the formation of such metal oxide or metal hydroxide, thereby yielding the composite particles composed of the metal oxide particles and the pigments. Since the composite particles are in the form of the metal oxide particles completely integrated with the pigments, highly favorable spectral sensitivity characteristics can be obtained.

Also, the first, second and third pigments used serve to enhance the intrinsic spectral sensitivity of the metal oxide to the primary colors of the additive principle, respectively.

BRIEF DESCRIPTION OF THE DRAWINGS

In any event, the present invention will become more clearly understood from the following detailed description of a preferred embodiment thereof, when taken in conjunction with the accompanying drawings. However, the embodiment and the drawings are given for the purpose of illustration and explanation only, and are not to be taken as being limitative of the present invention in any way whatsoever, whose scope is to be determined solely by the appended claims. In the drawings:

DETAILED DESCRIPTION OF THE PREFERRED EMBODIMENT

Hereinafter, the present invention will be described in connection with some examples which are taken only for the purpose of illustration and which should not therefore be understood as limitative of the scope of the present invention.

EXAMPLE I

Titanium oxide acetylacetonate was added with an excess of water and mixed with a small quantity of mmonium and the resultant mixture was sufficiently hydrolyzed at 60° C. to produce a white precipitate. After this precipitate had been heated for sintering for an hour at 350° C., the precipitate was assayed with the use of an X-ray diffraction technique, the result of which showed that the precipitate was composed of fine particles of $TiO_2$ crystal.

On the other hand, three types of pigment containing suspensions were prepared by thoroughly mixing 50 parts by weight of isopropyl alcohol with 3 parts by weight of tetrabromofluoresceine as a pigment having a spectral absorption band within the wavelength range of red color, 3 parts by weight of cyanine as a pigment having a spectral absorption band within the wavelength range of blue color or 3 parts by weight of tetrabromophenol blue as a pigment having a spectral absorption band within the wavelength range of green color, respectively.

The fine particles of $TiO_2$ crystal were immersed in each of the respective pigment containing suspensions and were subsequently dried to obtain three types of photoconductive powders each containing the above mentioned fine particles and the respective pigment as a principal component.

A mixture of each type of the photoconductive powder with ethyl alcohol was sprayed onto a respective substrate in the form of a slide glass having a pair of transparent electrodes formed thereon and spaced 100 microns apart from each other, and the substrate so sprayed was then dried to provide a respective sample for the spectral sensitivity measurement.

Figure 1:
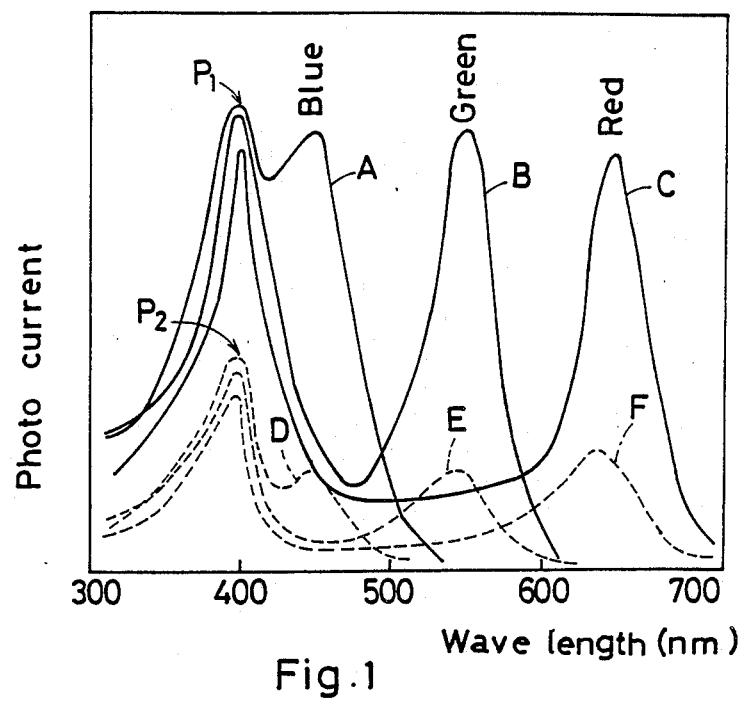
FIGS. 1 to 4 are graphs illustrating each the spectral sensitivity characteristics of photoconductive fine particles prepared according to the present invention and those according to the prior art method.

When examination was made to determine the spectral sensitivity of each of the three types of photoconductive powder, such results as shown by respective solid-lined curves A, B and C in the graph of FIG. 1 were obtained. In this graph of FIG. 1, for the purpose of comparison, three types of photoconductive powders prepared according to the prior art method by bonding the above listed pigments with $TiO_2$ particles with the use of acrylic binder were tested under identical conditions and the test results thereof are also shown by respective dotted curves D, E and F in the graph of FIG. 1.

Referring to the graph of FIG. 1, the curves A and D illustrate the pigment-sensitized characteristics exhibited by cyanine which is a pigment having a spectral absorption characteristic to blue rays of light; the curves B and E illustrate the pigment-sensitized characteristics exhibited by tetrabromofluoresceine which is a pigment having a spectral absorption characteristic for green rays of light; and the curve C and F illustrate the pigment-sensitized characteristics exhibited by tetrabromophenol blue which is a pigment having a spectral absorption characteristic for red rays of light. It is to be noted that the peak P1 and P2 of each of the characteristic curves exhibited at about 405 nm of wavelength represents the peak value of the photocurrent intrinsic in $TiO_2$.

As the characteristic curves D, E and F make it clear, the photoconductive powders made according to the prior art method exhibit an extremely low spectral sensitivity to each of the three primary colors of additive principle and the spectral sensitivity curves considerably overlap with each other at wavelengths other than the wavelength at which spectral absorption attains the peak value. Consequently, the red pigment, for example, also exhibits a high spectral response to green at about 550 nm of wavelength and this speaks iof the reproduced color image exhibiting a indistinct color.

In contrast thereto, as the characteristic curves A, B and C make it clear, the photoconductive powders made according to the method of the present invention exhibit a highly favorable spectral sensitivity to each of the three primary colors of additive principle and the overlap of the spectral sensitivity curves is minimized relative to the peak values.

In addition, the three types of the photoconductive particles made according to the method of the present invention were mixed with appropriate leuco dyes and binders to poduce photoconductive toner. The resultant photoconductive toners were, for the purpose of examining the applicability to color image formation, used in the electrophotographic process to form a reproduced color image on clay paper through a single cycle, i.e., one-shot process, of exposure, development and fixing. The result of this test has shown that, while the reproduced color was found pale when the photoconductive toner made according to the prior art method was used, the reproduced color was found distinct and satisfactory when the photoconductive toner made according to the method of the present invention was used.

Furthermore, in order to eliminate any possible adverse influence which would be brought about by the overlap of the spectral sensitivity characteristic curves shown in FIG. 1, tests were conducted with the use of Lionol Yellow and Lionol Red as respective filters to lower the spectral sensitivity to a color other than red, blue and green. The result off these tests has indicated that, while the color became slightly dense with the photoconductive toner according to the prior art method, the color was enhanced by the effects of the filters when the photoconductive toner according to the method of the present invention was used.

EXAMPLE II 30 parts by weight of diethoxy zinc was used as metal alkoxide and a solution prepared by mixing the diethoxy zinc with 50 parts by weight of ethyl alcohol was added and mixed with an excess water at 80° C. As a result thereof, hydrolysis of diethoxy zinc was accelerated to produce a white precipitate. This white precipitate was heated for an hour at 350° C., then added and mixed in three types of the same pigment-containing suspensions as in Example I to give colored precipitates which were subsequently filtered and dried to produce three types of photoconductive particles according to the method of the present invention.

As a result of analysis of the resultant photoconductive powders with the use of a scanning electron microscope and an X-ray microanalyzer, it has been found that each resultant photoconductive powder was composed of composite particles of ZnO and the respective pigment used.

Figure 2:
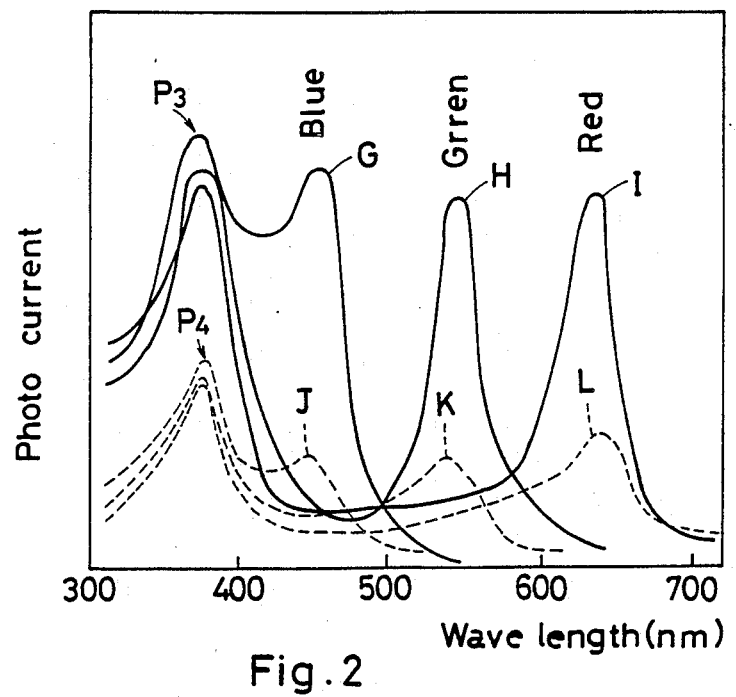

Also, the resultant photoconductive powders were tested in the same manner as in Example I as to the spectral sensitivity characteristics, the result of which is shown by the solid-lined curves G, H and I in FIG. 2.

For the purpose of comparison, three types of photoconductive powder prepared according to the prior art method by binding the above listed pigments with commercially available $TiO_2$ powder with the use of styrene binder were tested under identical conditions and the test results thereof are also shown by respective dotted curves J, K and L in FIG. 2.

It is to be noted that the peaks P3 and P4 of each of the characteristic curves exhibited at about 380 nm of wavelength represents the peak value of the photocurrent intrinsic in ZnO.

FIG. 2 shows the result similar to that of Example I and it will readily be understood from FIG. 2 that the photoconductive powders made according to the prior art method exhibit an extremely low spectral sensitivity to each of the three primary colors of additive principle and the spectral sensitivity curves considerably overlap with each other at wavelengths other than the wavelengths at which spectral absorption attains the peak value, whereas the photoconductive powders made according to the method of the present invention exhibit a highly favorable spectral sensitivity to each of the three primary colors of additive principle and the overlap of the spectral sensitivity curves is minimized relative to the peak value.

When the possibility of color image formation was examined with the use, as a photoconductive toner in an electrophotographic copying machine, of the photoconductive powders according to the method of the present invention and that according to the priior art method, similar results to that in Example I were obtained. In other words, it has been foun that, while the reproduced color was pale when the photoconductive toner made according to the prior art method was used, the reproduced color was distinct and satisfactory when the photoconductive toner made according to the method of the present invention was used.

The reason that the photoconductive powder prepared according to the method of the present invention has exhibited the feasible spectral sensitivity characteristics as shown in FIGS. 1 and 2 appears to have resulted from the fact that the method of the present invention makes use of a so-called sol-gel process. Mc re specifically, according to the sol-gel process, hydrolysis of metal alkoxide or metal acetylacetonate results in the formation of fine homogenous particles of metal oxide or metal hydroxide of high purity as is well known to those skilled in the art.

Furthermore, the inventors have found that, since the fine particles of the metal oxide or the metal hydroxide formed by the hydrolysis as hereinabove described are of a structure having a number of very fine interstices, the fine particles of the metal oxide or the metal hydroxide when immersed in the pigment containing suspensions can be impregnated with pigment molecules and retain them in stabilized manner within the interstices. This finding has provided the starting point from which the present invention has been developed.

Such structure and property of the fine particles of the metal oxide or the metal hydroxide appear to have resulted from, inter alia, the condensation of hydroxyl group and the dehydration of water molecules from the polymer gel both occurring during the condensation polymerization induced by the hydrolysis.

With the prior art photoconductive powders wherein the particles of the metal oxide are merely mixed with the pigments or coupled with the pigments by the use of the resinous binder, it appears that the direct contact between the metal oxide particles and the pigments is too weak to permit the energy bands to be continued with each other at the interface and, therefore, the spectral sensitization by the pigments cannot be smoothly enhanced.

In contrast thereto, the photoconductive powder prepared according to the present invention is made up of the composite particles wherein the metal oxide particles are completely integrated with the pigments as hereinbefore discussed and, therefore, the photoconductive powders could have exhibited a highly favorable spectral sensitivity characteristic.

Furthermore, it has been found that, as discussed in connection with Examples I and II, when the fine particles obtained by the hydrolysis of the metal alkoxide or the metal acetylacetonate, may be sintered before they are subsequently immersed in the pigment containing suspensions, the spectral sensitivity characteristic of the resultant photoconductive powder can further be improved. This appears to result from the fact that the sintering facilitates the complete dehydration and, also, the crystallization of the metal oxide. It is, however, to be noted that the sintering is not always essential in Examples I and II, in fact, without the fine particles being sintered, the intended photoconductive powder having such excellent characteristics as hereinbefore discussed can be obtained.

EXAMPLE III

First, second and third principal materials A1, A2 and A3 were respectively prepared by mixing 20 parts by weight of titanium propoxide, which is included the metal alcoxide, with 0.1 part by weight of tetrabromophenol blue as a first pigment D1 having a spectral absorption band within the wavelength range of red color; mixing 20 parts by weight of titanium propoxide with 0.1 part by weight of cyanine as a second pigment D2 having a spectral absorption band within the wavelength range of blue color; and mixing 20 parts by weight of titanium propoxide with 0.1 part by weight of eosin as a third pigment D3 having a spectral absorption band within the wavelength range of green color. Each of the first to third principal materials A1 to A3 was then mixed with 50 parts by weight of isopropyl alcohol to provide a first, second or third pigment containing suspension B1, B2 or B3. After the respective temperatures of these first to third pigment-containing suspensions B1 to B3 have been adjusted to 60° C., an excessive water was added to the first to third pigment-containing suspensions B1 to B3 to facilitate the hydrolysis of titanium isopropoxide contained in each of the principal materials A1 to A3. As a result of the hydrolysis, colored precipitates were yielded.

A result of analysis conducted revealed that these colored precipitates were found to be three types of composite particles C1, C2 and C3 (i.e., photoconductive powders) each composed of particles of amorphous $TiO_2$ and the respective pigment D1 to D3.

These photoconductive powders, that is, the composite particles C1 to C3, were then applied to respective substrates each in the form of a slide glass having a pair of transparent electrodes formed thereon and spaced 100 microns apart from each other. After the drying, these substrates applied respectively with the composite particles C1 to C3 were used as samples for the purpose of spectral sensitivity measurement, the result of this test being shown in the graph of FIG. 3.

On other hand, for the purpose of comparison, three types of photoconductive powder C11, C12 and C13 prepared according to the prior art method by bonding the above listed pigments D1 to D3 with $TiO_2$ powder with the use of acrylic binder were tested under identical conditions. The test results on the spectral sensitivity characteristic of these photoconductive powders C11 to C13 are also shown in the graph of FIG. 3.

Figure 3:
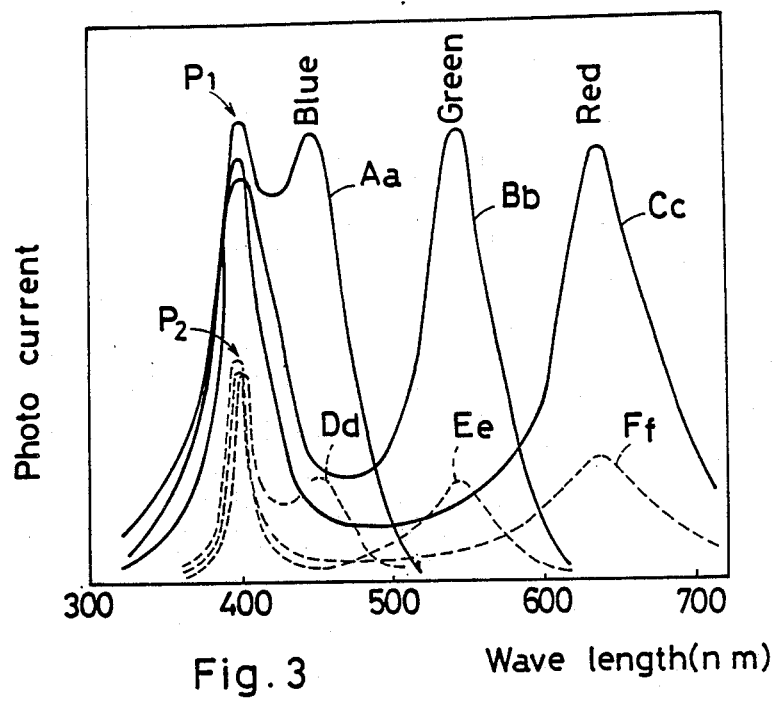

Referring now to the graph of FIG. 3 illustrating the spectral sensitivity characteristic of each of the tested samples, the axis of abscissas represents the wavelength in unit of nanometer while the axis of ordinates represents the photocurrent. In this graph, the solid-lined curves Aa, Bb and Cc represent the characteristic curves exhibited by the photoconductive powders C2, C3 and C1 according to the present invention, respectively, whereas the dotted curves Dd, Ee and Ff represent those exhibited by the prior art photoconductive powders C12, C13 and C11, respectively.

The curves Aa and Dd show that the respective photoconductive powders C2 and C12 were sensitized in the presence of the second pigment D2, that is, cyanine which is a pigment having a spectral absorption band within the wavelength region of blue light; the curves Bb and Ee show that the respective photoconductive powders C3 and C13 were sensitized in the presence of the third pigment D3, that is, eosin which is a pigment having a spectral absorption band within the wavelength region of green light; and the curve Cc and Ff show that the respective photoconductive powders C1 and C11 were sensitized in the presence of the first pigment D1, that is, tetrabromophenol blue having a spectral absorption band within the wavelength of red light. It is to be noted that the peak P1 and P2 exhibited by each of the characteristic curves at about 405 nm of wavelength represents the peak value of the photocurrent intrinsic in $TiO_2$.

As the characteristic curves Dd, Ee and Ff make it clear, the photoconductive powders C12, C13 and C14 made according to the prior art method exhibit an extremely low spectral sensitivity to the respective primary colors of additive principle, and the spectral sensitivity curves considerably overlap with each other at wavelengths other than the wavelength at which spectral absorption attains the peak value. This problem could not be removed even though the mixing ratio of the binder as well as the pigment and/or the type of $TiO_2$ were changed when the photoconductive powders according to the prior art method had been prepared for the testing purpose.

In contrast thereto, as the characteristic curves Aa, Bb and Cc make it clear, the photoconductive powders made according to the method of the present invention exhibit a highly favorable spectral sensitivity to the respective three primary colors of additive principle, and the overlap of the spectral sensitivity curves is minimized relative to the peak values.

In addition, the three types of the photoconductive powders made according to the method of the present invention and also according to the prior art method were mixed with appropriate leuco dyes and binders to produce the respective photoconductive toner. The resultant photoconductive toner were, for the purpose of examining the applicability to color image formation, used in the electrophotographic process to form a reproduced color image on clay paper through a single cycle, i.e., one-shot process, of exposure, development and fixing. The result of this test has shown that, while the reproduced color was found pale when the photoconductive toner comprised of the photoconductive powders C11 to C13 made according to the prior art method was used, the reproduced color was found distinct and satisfactory when the photoconductive toner comprised of the photoconductive powders C1 to C3 made according to the method of the present invention was used.

Furthermore, in order to eliminate any possible adverse influence which would be brought about by the overlap of the spectral sensitivity characteristic curves shown in FIG. 3, tests were conducted with the use of Lionol Yellow and Lionol Red as respective filters. The result of these tests has indicated that, while the color became slightly dense with the photoconductive toner according to the prior art method, the color was enhanced by the effects of the filters when the photoconductive toner according to the method of the present invention was used.

EXAMPLE IV

First, second and third pigment containing suspensions B1a, B2a, B3a similar to the pigment containing suspensions B1, B2 and B3 in Example III were prepared, except that in this Example IV 20 parts by weight of acetylacetonate of zinc was used in preparing each of the principal materials A1, A2 and A3 in place of 20 parts by weight of titanium propoxide used in Example III. Each of these pigment containing suspensions B1a to B3a was then mixed with an excessive water, to which a slight quantity of ammonium had been added, to facilitate the hydrolysis, thereby to produce three types of colored precipitates.

A result of analysis conducted revealed that these colored precipitates were found to be three types of composite particles C1a, C2a and C3a (i.e., photoconductive powders) each composed of particles of amorphous ZnO and the respective pigment D1 to D3.

These photoconductive powders, that is, the composite particles C1a to C3a, were then applied to respective substrates each in the form of a slide glass having a pair of transparent electrodes formed thereon and spaced 100 microns apart from each other. After the drying, these substrates applied respectively with the composite particles C1a to C3a were used as samples for the purpose of spectral sensitivity measurement in a manner identical with the measurement as in Example III, the result of this test being shown in the graph of FIG. 4.

On other hand, for the purpose of comparison, three types of photoconductive powder C11a, C12a and C13a prepared according to the prior art method by bonding the above listed pigments D1 to D3 with commercially available ZnO powder with the use of styrene binder were tested under identical conditions. The test results on the spectral sensitivity characteristic of these photoconductive powders C11a to C13a are also shown in the graph of FIG. 4.

Figure 4:
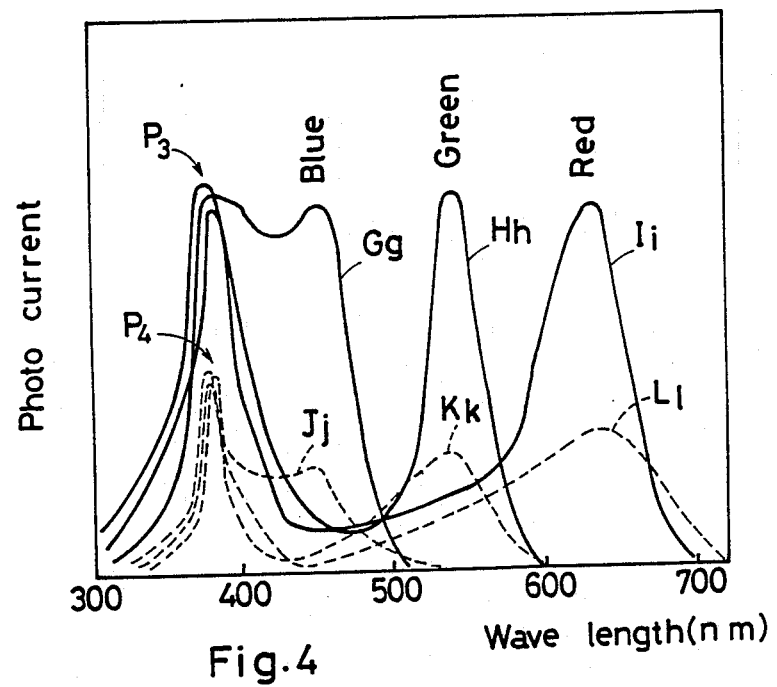

Referring now to the graph of FIG. 4 illustrating the spectral sensitivity characteristics of each of the tested samples, the axis of abscissas represents the wavelength in unit of nanometer while the axis of ordinates represents the photocurrent. In this graph, the solid-lined curves Gg. Hh and Ii represent the characteristic curves exhibited by the photoconductive powders C2a, C3a and C1a according to the present invention, respectively, whereas the dotted curves Jj, Kk and Ll represent those exhibited by the prior art photoconductive powders C12a, C13a and C11a, respectively. It is to be noted that the peak P3 and P4 exhibited by each of the characteristic curves at about 380 nm of wavelength represents the peak value of the photocurrent intrinsic in ZnO.

As can be understood from the comparison of the characteristic curves shown in the graph of FIG. 4, a result similar to that in Example III could be obtained. More specifically, the photoconductive powders C11a, C12a and C13a made according to the prior art method exhibit an extremely low spectral sensitivity to the respective primary colors of additive principle, and the spectral sensitivity curves considerably overlap with each other at wavelengths other than the wavelength at which spectral absorption attains the peak value, whereas the photoconductive powders made according to the method of the present invention exhibit a highly favorable spectral sensitivity to the respective three primary colors of additive principle, and the overlap of the spectral sensitivity curves is minimized relative to the peak values.

In addition, the three types of the photoconductive powders made according to the method of the present invention and also according to the prior art method were mixed with appropriate leuco dyes and binders to produce the respective photoconductive toner. The resultant photoconductive toner were, for the purpose of examining the applicability to color image formation, used in the electrophotographic process to form a color image on clay paper in a manner similar to that in Example III. The result of this test was similar to that described under Example III.

The reason that the photoconductive powders prepared according to the method of the present invention have exhibited the feasible spectral sensitivity characteristics as shown in FIGS. 3 and 4 appears to have resulted from the fact that the method of the present invention makes use of a so-called and sol-gel process. More specifically, according to the sol-gel process, hydrolysis of metal alcoxide or metal acetylacetonate results in the formation of fine homogenous particles of metal oxide or metal hyroxide of high purity as is well known to those skilled in the art.

Furthermore, the inventors have found that, during the formation of the fine composite particles as a result of hydrolysis, molecules of the pigments used in the pigment containing suspensions can be absorbed into the microstructure of the metal oxide or the metal oxide or the metal hydroxide and can therefore be retained in stabilized manner within the structure of the metal oxide or the metal hydroxide. This finding has also provided the starting point from which the present invention has been developed.

With the prior art photoconductive powders wherein the particles of the metal oxide are merely mixed with the pigments or coupled with the pgiments by the use of the resinous binder, it appears that the direct contact between the metal oxide particles and the pigments is too weak to permit the energy bands to be continued with each other at the interface and, therefore, the spectral sensitization by the pigments cannot be smoothly enhanced. This is in contrast to the present invention wherein the photoconductive powders is made up of the composite particles having the metal oxide particles completely integrated with the pigments as hereinbefore discussed and, therefore, the photoconductive powders according to the present invention could have exhibited a highly favorable spectral sensitivity characteristic.

Although the present invention has been fully described with reference to the accompanying drawings in connection with the preferred embodiments thereof taken only for the purpose of illustration, various changes and modifications can readily be conceived by those skilled in the art upon the reading of the disclosure herein made. By way of example, the pigments that can be utilized in the practice of the method of the present invention are not always limited to that listed in the foregoing description, but other pigments than those listed above can be equally employed. In other words, where the other pigments than those listed above are to be used, they must be of a type capable of sensitizing the intrinsic spectral sensitivity of the metal oxide to the rays of light of the primary colors, red, blue and green, of additive principle. This means that the other pigments to be used in the practice of the present invention should be selected from pigments each having such a spectral sensitivity as to absorb light of each of the additive primary colors. Where these pigments as discussed above are used, energies of light obtained when any one of the rays of light of the primary colors is absorbed can be easily transmitted to the metal oxide particles accompanied by the movement of electrons and, therefore, it is possible to increase, that is, enhance, the photocurrent.

Although in any one of Examples I to IV reference has been made to the use of only one substance for each of the pigments, a mixture of two or more dyes may be equally employed for each of the pigments utilizable in the practice of the present invention.

Also, the dyes used in the three types of the pigment containing suspensions used in the practice of the present invention must differ from each other, and the same dyes should not be used for each of the suspensions.

The metal alkoxide or the metal acetylacetonate used in the practice of the present invention should be of a type that the metal oxide which is the final product formed through the hydrolysis can have properties similar to those exhibited by a semiconductor, examples of which include, in addition to alkoxide or acetylacetonate of Ti and Zn referred to in the foregoing description, those of Sn, Cu, Ni, Cd, In, Fe and Sb. However, since the purpose of the present invention is to provide the photoconductive powder capable of exhibiting a peak spectral sensitivity to each of the primary colors within the visible region of wavelength by the action of the sensitized pigments, the use of the alkoxide or acetylacetonate of Ti and Zn is most preferred in view of the fact that they have a spectral sensitivity high within the ultraviolet region, resulting in relatively low within the visible wavelength region and can be readily sensitized by the pigments used.

Accordingly, such changes and modifications are to be construed as included within the scope of the present invention as defined by the appended claims unless they depart therefrom.

We claim:

1. A method of making a photoconductive powder which comprises the steps of:

mixing in a solution a first principal material containing one or more compounds selected from the group consisting of a metal alkoxide and metal acetylacetonate, which are combined with the respective metal, with a first pigment having a spectral absorption band within the wavelength region of red color so as to provide a first suspension;

mixing in a solution a second principal material containing one or more of said compounds with a second pigment having a spectral absorption band within the wavelength region of blue color so as to provide a second suspension;

mixing in a solution a third principal material containing one or more of said compounds with a third pigment having a spectral absorption band within the wavelength region of green color so as to provide a third suspension;

allowing said first, second and third principal materials to undergo hydrolysis to produce corresponding, first, second and third composite particles composed of particles of oxides of the respective metal and particles of said first, second and third pigments.

2. The method as claimed in claim 1, wherein said first, second and third principal materials are identical.

3. The method as claimed in claim 1, wherein each of said first, second and third pigments is made up of one or more dyes, said dyes in each of said pigments differing from each other.

4. The method as claimed in claim 1, wherein the metal alkoxide or the metal acetylacetonate is formed from a metal selected from the group consisting of Zn, Ti, Sn, Cu, Ni, Cd, In, Fe and Sb.

5. The method as claimed in claim 4, wherein the metal alkoxide or the metal acetylacetonate is formed from Zn or Ti.

6. The method as claimed in claim 1, wherein said fine particles of metal oxide are prepared by employing a sol-gel process to hydrolyze the metal alkoxide or metal acetylacetonate.

7. The method as claimed in claim 1, wherein the metal alkoxide or metal acetylacetonate is a member selected from the group consisting of titanium oxide acetylacetonate, diethoxy zinc, titanium propoxide, and zinc acetylacetonate.

* * * * *